UNITED STATES PATENT OFFICE.

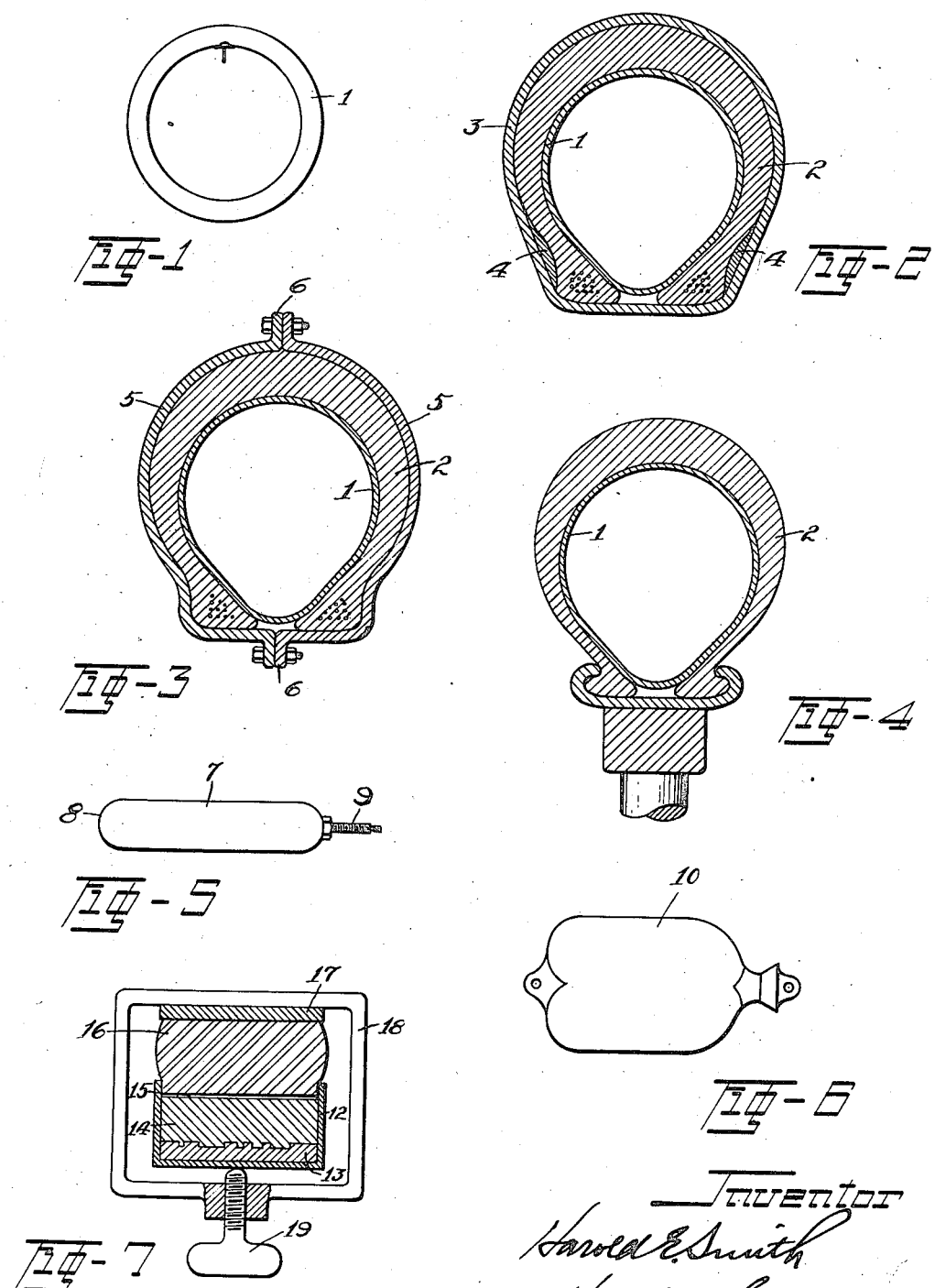

HAROLD E. SMITH, OF CLEVELAND HEIGHTS, OHIO.

FLEXIBLE HEAT-RESISTANT RUBBER ARTICLE.

1,322,734.

Specification of Letters Patent.   Patented Nov. 25, 1919.

Application filed March 7, 1918.  Serial No. 221,042.

*To all whom it may concern:*

Be it known that I, HAROLD E. SMITH, a citizen of the United States, residing at Cleveland Heights, in the county of Cuyahoga and State of Ohio, have invented a certain new and useful Improvement in Flexible Heat-Resistant Rubber Articles, of which the following is a full, clear, and exact description, reference being had to the accompanying drawings.

This invention relates to the curing of rubber articles and especially to the manufacture and repair of pneumatic tires, although not limited to that use.

A general object of the invention is the provision of a yielding or elastic member for use in connection with the heat-curing or "vulcanization" of sulfurized rubber, said member being made of such material as to withstand with little or no deterioration the temperatures and pressures required by such curing process, without loss of flexibility on its own part.

In the construction of many pneumatic tires at the present time it is customary, after having formed the body or carcass of the tire upon a suitable metal core and before heat-treating the same in any way, to remove the same from said core and insert therein an annular inflatable tube of soft rubber. The exterior of the tire body or carcass is then covered so as to maintain its shape and size, sometimes by means of an iron shell and at other times by binding with wet cloths. The inner tube is then inflated to a pressure of from 75 to 150 pounds per square inch and the whole article subjected to a predetermined degree of heat, generally from 212° F. to 300° F., whereupon the heating, accompanied as it is by constant pressure from the inside, (and also by the shrinking of the wet cloths when these are used), produces a tire of great uniformity, flexibility and resiliency.

Likewise in repairing tires, the injured portion is inclosed in a metal clamp of appropriate size and shape and the interior of the tire is provided throughout that portion with an inflatable, expansible bottle which is similarly pumped to high pressure and the clamp then heated to the required temperature.

Heretofore, for these inner tubes and bottles nothing but ordinary sulfurized rubber has been known, and it has been found that with each succeeding heat-treatment the same becomes further vulcanized and hardened until it becomes brittle and breaks apart under the pressure. Only seldom will one of the inner tubes described withstand 40 treatments before it has to be discarded and the cost of the same constitutes a very important charge against the cost of each tire. The air bottles used by the repair men also have to be renewed frequently.

Without limiting myself to this use, the specific object of my invention is the provision of tubes, bottles, etc., made from a substance which will possess the qualities of elasticity required but without suffering the same deterioration while in use; and the essence of my invention consists in this, that instead of making the said articles of sulfurized rubber, which is the substance ordinarily employed in the tires or other articles made thereon, I construct them of rubber, mixed, combined or alloyed with one of the other elements of the sulfur group, preferably tellurium. An article of this nature, made of tellurized rubber, requires a higher temperature for its original "vulcanization" (if the word can be applied to the tellurium treatment which has hitherto meant only sulfur treatment under heat), than is required for sulfurized rubber, and after having been formed can be heated repeatedly to the temperature required for curing pneumatic tires (or other sulfurized rubber articles) with very little deterioration. The manner of making the article is exactly the same as is employed in the case of sulfurized rubber, except that tellurium or a compound thereof is employed instead of sulfur, and the same is cured at a higher temperature, preferably between about 350° F. and 400° F. In case pure raw rubber is not conveniently available a rubber mixture containing a small amount of sulfur can be used.

In the drawings accompanying and forming a part of this application I have shown a few of the many practical forms in which my invention may be embodied. In these drawings Figure 1 represents an annular hollow tube adapted for insertion in a tire casing either for original curing or for subsequent use; Fig. 2 represents the use of such a tube inside a tire casing while curing, the exterior of the casing being cloth-wound; Fig. 3 represents a similar curing-step the casing being inclosed in a pressed-metallic shell; Fig. 4 represents the use of such an inner tube in actual tire-operation; Fig. 5 illustrates a repair bottle, and Fig. 6 a domestic hot water bottle made of the said rubber composition; and Fig. 7 illustrates another general mode of application of a cushioning member of the improved rubber composition to the vulcanization of sulfurized rubber.

In Figs. 1, 2, 3 and 4, 1 represents the flexible tube of rubber-composition, and 2 the tire casing. In Fig. 2, 3 represents a cloth winding, preferably applied wet so that the shrinkage on drying will additionally compress the casing-material. 4, 4 represents filling pieces employed to fill the reentrant spaces at the sides of the tire so that the winding may exert a continuous pressure at all points. In Fig. 3, 5, 5 represent the two halves of a sheet metal shell, suitably bolted together at 6, 6; this shell is of a size slightly to constrict the casing when first applied thereto, and is so applied before the inner tube is inflated. This tube is then filled with fluid at a pressure of from 75 to 125 pounds per square inch, so as to compress the casing-material and form a compact body, free from air bubbles.

In Fig. 5, 7 represents a cylindrical bottle of tellurium (or selenium) rubber, having one end closed as at 8 and the other end provided with an air-valve 9. In Fig. 6, 10 represents the flexible body of a hot water bottle made of tellurium-rubber.

In Fig. 7 I have illustrated the use of a cushioning member of the improved rubber-composition to a process of vulcanizing sulfur-rubber, this cushion not involving the use of air. For this I have chosen, by way of example, the formation of a rubber stamp. 12 represents a metal cup or frame, having in its bottom the matrix 13; and 14 represents the sulfur-rubber mass which is to be vulcanized. Upon this mass is placed a parting-strip 15 of cloth or sheet metal, and then a block of elastic tellurium (or selenium) rubber 16, surmounted by a pressure plate 17. The whole is embraced by a frame 18 having a thumb screw 19 by which pressure is exerted, this pressure being stored in the block 16 which retains its elasticity during the heat of the curing process and forces the mass being vulcanized into constant contact with the matrix, preventing air bubbles and insuring a sharp copy.

I do not confine myself to a complete avoidance of sulfur in these articles since the presence of tellurium, even in conjunction with sulfur, increases greatly the flexibility and causes those articles to withstand much higher temperatures without deterioration than the sulfurized rubber alone would withstand. However, I prefer that sulfur should be absent, since a sulfur-free compound of rubber and tellurium appears to be more permanent at the temperatures required than does a rubber compound containing sulfur in addition to the tellurium.

Likewise, while I prefer tellurium, I do not limit myself against the use of selenium, although my preference is against its employment as being less resistant to chemical change than the tellurium compound. However on the score of resistance to heat deterioration I consider selenized rubber superior to sulfurized rubber and hence lay claim generically thereto.

Also I do not confine myself to the use of this material in the manufacture of inner tubes and pressure bottles solely for the original manufacture of tires, but may use the same in the manufacture of inner tubes for ordinary use, since the higher resistivity of the tellurium rubber to heat deterioration enables them to withstand better than sulfurized rubber the temperatures sometimes produced by hard riding and thus prevents or delays the hardening and cracking of the inner tube. And as to bottles, the short life of the ordinary domestic hot water bottle is occasioned largely by the over-vulcanization produced by the repeated heating, which can be greatly relieved.

Another fruitful source of deterioration of sulfurized rubber is the oxidation of the sulfur, caused by atmospheric action in the presence of light and heat, to form sulfuric acid, which seriously injures the material. This action is entirely absent in the case of tellurized rubber.

Many other uses of my said invention and numerous additional advantages will occur to those skilled in the art, although I estimate most highly and desire particularly to secure by these Letters Patent the employment of this material in connection with the curing of the sulfurized rubber on account of their differential resistance to heat deterioration heretofore explained.

Having thus described my invention, what I claim is:—

1. An inflatable expansible body for use in the heat-curing of sulfurized rubber tires composed of rubber containing a substance of the sulfur-group but having an atomic weight higher than that of sulfur.

2. An inflatable expensible body for use in the heat-curing of sulfurized rubber tires composed of rubber containing tellurium.

3. A hollow flexible article adapted to contain heated fluid and having walls of tellurized rubber.

4. A hollow elastic inflatable tube adapted for insertion inside a tire casing and made of rubber containing a member of the sulfur group having an atomic weight greater than 75.

5. A cushioning body for use in the heat-curing of sulfurized rubber and consisting of rubber containing tellurium.

6. A cushioning body for use in the vulcanization of sulfurized rubber consisting of rubber containing a vulcanizing substance of the sulfur group but having an atomic weight higher than that of sulfur.

7. As an article of manufacture, a flexible elastic body made of tellurized rubber and retaining its flexibility under prolonged contact with air and boiling water.

8. As an article of manufacture a flexible elastic hollow body having walls made of rubber containing a vulcanizing substance of the sulfur group but having an atomic weight higher than that of sulfur.

In testimony whereof, I hereunto affix my signature.

HAROLD E. SMITH.